United States Patent
Boss et al.

(10) Patent No.: US 10,496,604 B2
(45) Date of Patent: Dec. 3, 2019

(54) SYSTEM AND METHOD FOR PROVIDING AND/OR OBTAINING ELECTRONIC DOCUMENTS

(71) Applicant: INTERNATIONAL BUSINESS MACHINES CORPORATION, Armonk, NY (US)

(72) Inventors: Gregory J. Boss, American Fork, UT (US); Karyn T. Corneli, Austin, TX (US); Brian D. Goodman, Norwalk, CT (US); Rick A. Hamilton, II, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1464 days.

(21) Appl. No.: 13/733,418

(22) Filed: Jan. 3, 2013

(65) Prior Publication Data

US 2013/0124543 A1     May 16, 2013

Related U.S. Application Data

(62) Division of application No. 11/427,668, filed on Jun. 29, 2006, now Pat. No. 8,364,596.

(51) Int. Cl.
| | | |
|---|---|---|
| *G06F 17/21* | (2006.01) | |
| *G06F 16/16* | (2019.01) | |
| *G06F 16/14* | (2019.01) | |
| *H04L 12/58* | (2006.01) | |
| *G06F 16/335* | (2019.01) | |

(52) U.S. Cl.
CPC ............ *G06F 16/16* (2019.01); *G06F 16/148* (2019.01); *G06F 16/335* (2019.01); *H04L 51/14* (2013.01); *H04L 51/26* (2013.01)

(58) Field of Classification Search
CPC ...... G06F 16/16; G06F 16/148; G06F 16/335; H04L 51/14; H04L 51/26
USPC .......................................................... 705/57
See application file for complete search history.

(56) References Cited

U.S. PATENT DOCUMENTS

| | | |
|---|---|---|
| 5,937,414 A | 8/1999 | Souder et al. |
| 6,122,630 A | 9/2000 | Strickler et al. |
| 6,574,617 B1 | 6/2003 | Immerman et al. |
| 6,636,873 B1 | 10/2003 | Carini et al. |
| 6,785,721 B1 | 8/2004 | Immerman et al. |

(Continued)

OTHER PUBLICATIONS

"Data Mining: Concepts and Techniques" (Jiawei Han, Department of Computer Science, University of Illinois at Urbana-Champaign, Data Mining: Concepts and Techniques, 2nd ed., The Morgan Kaufmann Series in Data Management Systems, Jim Gray, Series Editor, Morgan Kaufmann Publishers, Mar. 2006. ISBN 1-55860-901-6, 129 pages).*

(Continued)

*Primary Examiner* — James D Nigh
(74) *Attorney, Agent, or Firm* — Brian Restauro; Andrew M. Calderon; Roberts Mlotkowski Safran Cole & Calderon, P.C.

(57) ABSTRACT

A system and method including filtering electronic data on a transaction per transaction basis and replicating the filtered electronic data in response to a request to obtain electronic data on the transaction per transaction basis. The system and method further include providing the filtered replicated electronic data for viewing.

18 Claims, 6 Drawing Sheets

(56) References Cited

U.S. PATENT DOCUMENTS

| | | |
|---|---|---|
| 7,072,942 B1 | 7/2006 | Mailer |
| 7,237,009 B1 | 6/2007 | Fung et al. |
| 7,499,958 B1 * | 3/2009 | Ionescu .................. G06F 16/27 |
| 2002/0161893 A1 | 10/2002 | Wical |
| 2003/0172044 A1 * | 9/2003 | ShamRao ................. G06F 8/61 |
| 2004/0154022 A1 * | 8/2004 | Boss .................... G06Q 10/107 |
| | | 719/310 |
| 2004/0186851 A1 * | 9/2004 | Jhingan ................... H04L 51/00 |
| 2005/0008001 A1 | 1/2005 | Williams et al. |
| 2005/0060643 A1 * | 3/2005 | Glass .................. G06F 17/241 |
| | | 715/205 |
| 2005/0136884 A1 | 6/2005 | Reidelsturz et al. |
| 2006/0036471 A1 | 2/2006 | Sanjay-gopal et al. |
| 2006/0064037 A1 * | 3/2006 | Shalon ................. A61B 5/0006 |
| | | 600/586 |
| 2006/0127950 A1 * | 6/2006 | Bosques ................ G01N 33/66 |
| | | 435/7.1 |
| 2007/0100978 A1 * | 5/2007 | Levi ....................... H04L 51/14 |
| | | 709/223 |

OTHER PUBLICATIONS

"Data Mining Algorithms (Analysis Services—Data Mining)" (retrieved from https://docs.microsoft.com/en-us/sql/analysis-services/data-mining/data-mining-algorithms-analysis-services-data-mining, dated Mar. 2, 2016 and retrieved at May 31, 2017 1:45:08 PM, 6 pages).*

"Data Mining Techniques" (Brown, "Data Mining Techniques", 20 pages, dated Dec. 11, 2012 and retrieved from https://www.ibm.com/developerworks/library/ba-data-mining-techniques on May 31, 2017).*

Roecker et al. ("Context-Dependent Email Notification Using Ambient Displays and Mobile Devices", 0-7803-9035-0/05/$20.00 IEEE, Nov. 16, 2005, 2 pages (No. 137 and 138)).*

Komninos ("Personal Predictive Internet Content Pre-caching for Mobile Devices", Andreas Komninos, University of Strathclyde Department of Computer and Information Science, 2005, 202 pages).*

IEEE 100, The Authoritative Dictionary of IEEE Standards Terms, Seventh Edition, p. 965.*

Terry, D., "Replication in an INformation Filtering System", IEEE, 1992, pp. 66-67.

Sun, C., "Rule-Base Structure Identification in an Adaptive-Network-Based Fuzzy Inference System", IEEE Transactions on Fuzzy Systems, vol. 7, No. 1, Feb. 1994, pp. 64-73.

* cited by examiner

FIG. 7

SYSTEM AND METHOD FOR PROVIDING AND/OR OBTAINING ELECTRONIC DOCUMENTS

CROSS REFERENCE TO RELATED APPLICATION

This application is a Divisional of U.S. application Ser. No. 11/427,668, filed on Jun. 29, 2006, the contents of which are incorporated by reference herein in their entirety.

FIELD OF THE INVENTION

The invention generally relates to a system and method for providing electronic documents and, more particularly, to a system and method for replicating one or more subsets of electronic documents using rule based filtering and/or artificial intelligence.

BACKGROUND OF THE INVENTION

The transfer of electronic data over a network is quite ubiquitous in today's age of computer technology. This electronic data may be email, photographs, video, business presentations, or the like, all of which vary in storage space requirements and transmission times over a network. Of course, larger documents, etc. will require larger amounts of storage space and longer transmission times than a smaller document.

It is not uncommon for electronic data to be transmitted to a server for future retrieval or, in the case of email, replication and delivery to a remote device such as, for example, a portable digital assistant (PDA). These transmissions may be over a network such as, for example, the Internet, LAN, WAN, etc. all of which may be accessed through a variety of mechanisms. By way of example, the end user may have a dial-up connection, wireless devices and mechanisms, broadband connection and the like. Depending on the type of connection and a host of other factors such as location, accessibility, etc. the downloading time of the electronic data will vary.

In the situation of email, for example, it is not uncommon for users to receive hundreds of emails in a day, all of varying size and importance. Because of many factors such as the amount of email received each day, limited resources, e.g., storage space on the PDA or limited bandwidth to download many documents, etc. the user may not be able to download an important document in the time available. Take for example a marketing representative currently on travel with only a limited time, e.g., thirty minutes, before the next flight. The marketing representative receives an urgent phone message requesting review of a critical document with a very short required turn-around-time. Within this tight window of opportunity, the user must find a power source and network source to download the presentation to review. In this situation, the user only has a dial-up connection and the presentation is 10 MB. Using existing technology, the user has no way to give priority to this one particular email and ignore all other email.

Thus, using today's technology, the user has limited choices to control the transfer of data over the network, which is important to many users requiring immediate access to certain important documents, but with only a limited amount of time or resources to download these important documents. By way of example, current technology addresses the issue of limiting excessive data transfer by limited means, including:

tagging of the electronic data as high priority, a simple approach which is not discriminating as to which document should be downloaded first; and limiting the number of new pieces of electronic data to transfer, by quantity, by data size or partial or summary type formats.

Lotus Notes® is one type of application, which allows limited data transfer. Lotus Notes is well known for its strengths in replication, above all others in the industry. By way of illustration, Lotus Notes replication has the ability to front load the replication queue with smaller documents first so that one large document does not hold many smaller documents "hostage" until the larger one is downloaded. Notes will then prioritize those documents via a binary urgency flag, and finally it allows for summary data to be transmitted to the end user—limiting the content of the entire message Still other solutions use the notion of headers in email, or NNTP allows the transfer of basic information while reserving the details for a follow-on interaction. Other technologies include the notion of transcoding where an intermediary server modifies the data transferred as part of a transaction. But these techniques lack the required granularity and flexibility needed to efficiently sort and replicate the data for downloading. Thus, in current technologies, all of the data is still transferred even if only one piece of data is required or desired by the user. In fact, current replication technology is only accomplished based on limited meta data, e.g., size, time and a binary urgency flag. By way of further example:

Sub-set gross replication: This technique identifies files stored in a particular way (folder/category) and transfers all of the files (not just files which are most important); and Transcoding proxy solutions: This technique reduces the data by altering the data.

Accordingly, there exists a need in the art to overcome the deficiencies and limitations described hereinabove.

SUMMARY OF THE INVENTION

In a first aspect, a method comprising filtering electronic data on a transaction per transaction basis and replicating the filtered electronic data in response to a request to obtain electronic data on the transaction per transaction basis. The method further includes providing the filtered replicated electronic data for viewing.

In another aspect of the invention, the method comprises storing electronic data in a server, receiving a request to obtain a subset of the electronic data and filtering the electronic data on a transaction by transaction basis based on characteristics of the electronic data. The method further includes replicating the filtered electronic data in response to the request to obtain electronic data on the transaction per transaction basis and providing the filtered replicated electronic data over a network for viewing of the filtered replicated electronic data.

In yet another aspect of the invention, a system comprises a server having a database containing electronic data, and at least one of a hardware and software component for searching the data store for content associated with the electronic data based upon a search criteria. The system compares the search criteria to the content associated with the electronic data and replicates certain parts of the electronic data based on search results. The system presents the replicated electronic data to a user by displaying a list of the one or more replicated electronic data, which have matching categories with the search result.

In a further aspect of the invention, a computer program product comprising a computer usable medium having readable program code embodied in the medium includes at least one component to implement steps of the invention.

A further aspect of the invention includes a method for deploying computing infrastructure, comprising integrating computer-readable code into a computing system. The code in combination with the computing system is capable of performing a process of replicating said process comprising the steps of invention.

DETAILED DESCRIPTION OF EMBODIMENTS OF THE INVENTION

The invention is directed to a system and method for replicating electronic data using rule based filtering and/or artificial intelligence. The invention can be implemented for searching, replicating and retrieving electronic data within any database, over any distributed network or stand-alone server, for example. The system and method of the invention, in one embodiment, accelerates a user's retrieval of such electronic documents, e.g., email, presentations, videos, etc, by, in one implementation, filtering on a transaction per transaction basis based on the characteristics of the electronic data at any given moment. This provides exceptional granularity and flexibility in prioritizing the replication of the data.

In aspects of the invention, the replication may be based on meta data including context, correlation between email and calendar, sender, recipient and subject matter using, for example, artificial intelligence of a server. By using the artificial intelligence, in conjunction (or separately) with the rule based filtering, the artificial intelligence "learns" the types of queries the user performs most often and will distribute an automatic replication theory based on these uses. The artificial intelligence may also refer to other factors to the automatic replication theory such as, for example, calendar entries to correlate an efficient level of automatic replication based on key elements. In this manner, the electronic data can be tagged and queried allowing for a more "intelligent" type of approach to replication.

By using the system and method of the invention, point-in-time sub-set identification and replication based on a variety of schemes including rule based filtering is accomplished. This solves the prioritization problem of time-constrained document replication and allows a user to specify which documents would be downloaded, by any of several mechanisms discussed herein.

It should be understood by those of skill in the art that the examples provided herein are based on the replication of email; however, the system and method of the invention is equally applicable to any data replication solution. The term "replication" or variants thereof can imply either synchronization or one way (push or pull) data transfer; although, in the case of some conventions data is transferred and then removed from servers (POP3 Mail) (which is included in the scope of this invention).

Figure 1A:
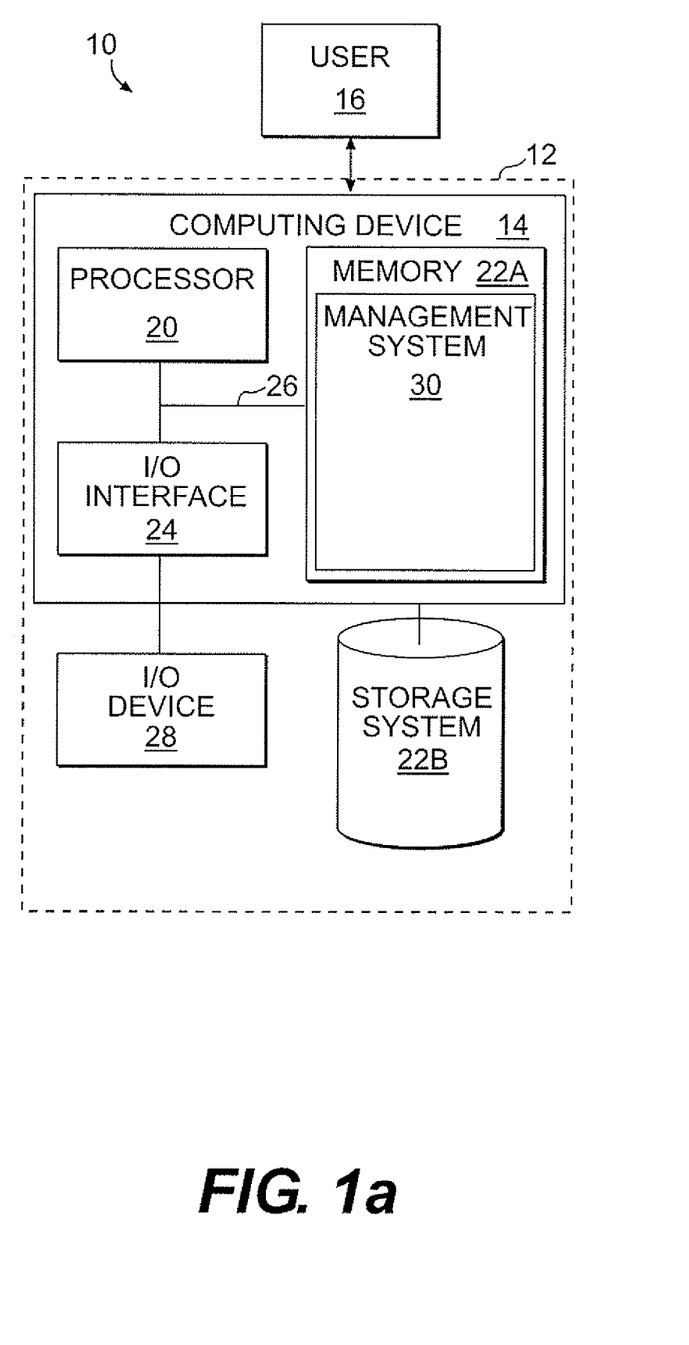
FIG. 1a is a block diagram of an environment implementing embodiments of the invention.

FIG. 1a shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data, such as the business solution 50, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

Figure 1B:
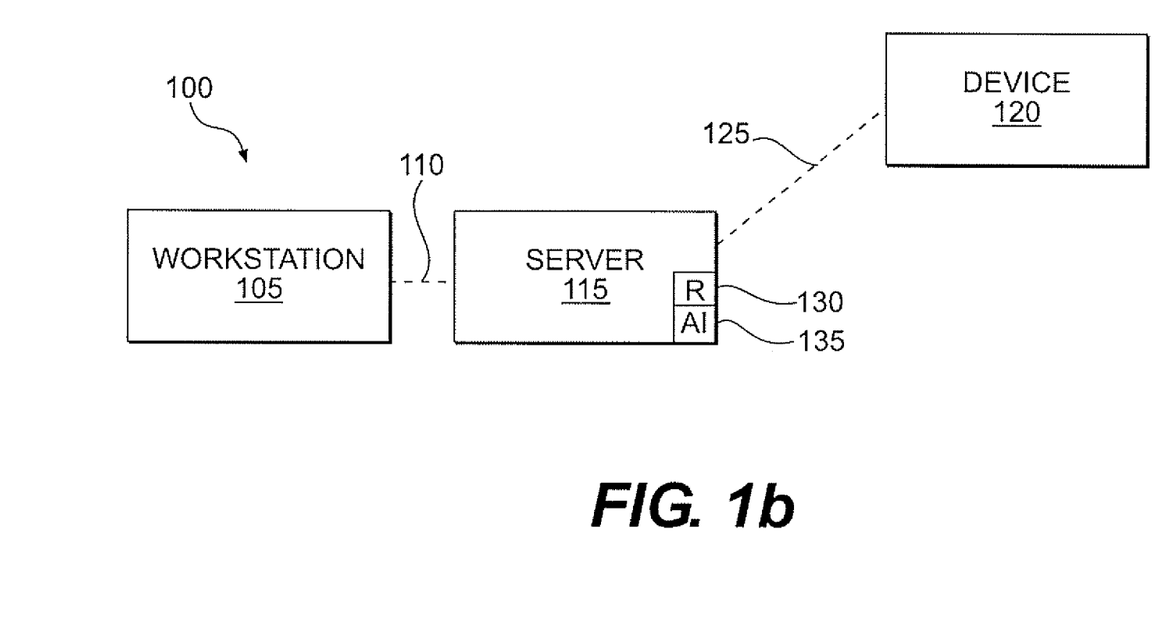
FIG. 1b is a block diagram of an embodiment of the invention.

FIG. 1b is a block diagram of an embodiment of the invention, generally denoted by reference numeral 100. Similar to FIG. 1a, the components of FIG. 1b may be used to implement the processing of the invention, as discussed more fully below. The invention includes at least one user workstation 105 (i.e., a computer for a user, a workstation, client workstation, remote device, etc.) which typically has a memory device (for example, a hard drive, DVD drive, or the like), processor and accompanying components, all well-known to those of skill in the art. The user workstation 105 may be connected via a network 110 (e.g., a local area network (LAN), a wide area network (WAN), wireless network, or the Internet) to one or more server 115. For illustrative purposes, the server 115 may be representative of content sources which one of ordinary skill in the art would recognize may be any number of servers and may be different content sources such as, for example, WebSphere, DB2 databases, Web sites, or the like.

Still referring to FIG. 1b, in embodiments of the invention, a remote device 120 is in communication with the server via a same or different network connection, depending on the specific implementation of the invention. The remote device 120 may be a computer, workstation, PDA, cellular telephone or any other type of device capable of downloading electronic data.

The system of the invention further includes a rule base filtering mechanism 130 and an artificial intelligence agent 135, which may be resident on the server, in embodiments. The rule based filtering mechanism 130 provides the user the ability to define email replication rule sets with user and subject filtering. The rule sets may be defined by the user as a permanent setting or for a one-time replication action. For example, in one application, the system and method provides receive and send definitions: "Mail Replication options—select inbox or outbox". These definitions may include, for example:

Replicate only files with attachments: This allows the user to request replication based on any part of the email form.

Replicate based on search criteria. This allows a user to define a certain criteria to search any part of an email or emails;

Replicate based on rules defined by usage patterns; This allows a user to obtain emails based on patterns of viewed emails;

Replicate based on rules defined by device: This allows a user to obtain emails based on events such as, for example, time of day, calendar, scheduled event, previously viewed emails, recipients, senders, etc. and/or Replicate based on predefined rules: This allows a user wherein rules are optionally shared.

By using these definitions, the system and method offers granular control over data replication at transaction time thus providing the email recipient with the ability to identify and selectively replicate data on a transaction by transaction basis.

It is contemplated herein that two methods can be used to accomplish the data replication, in accordance with the invention. These methods include, for example, a rule based filtering system accessible by a user using a graphical user interface and a machine learning approach. The graphical user interface offers a method for restricting replication based on data properties and more advanced search criteria and data sampling; whereas, the machine learning (or AI) approach allows the system to perform pattern analysis as a basis for replication priority. In this latter approach, the user is able to gain benefits without the need for defining rules.

The system and method of the invention provides the ability to modify a given replication transaction in the following ways:

Identify a sub-set replication query through the use of basic terms defined by the data format. For email this might include, from, urgency tagging, profile or device definition or size.

Identify a sub-set replication query in a more advanced query based on free text matching against known fields in the data format using AND, OR, NOT, CONTAINS, BEGINS WITH, ENDS WITH, or other Boolean expressions.

Preview results by identifying a sub-set replication query by defining a query, pulling headings and presenting the list before executing replication with the query.

Identify a sub-set replication query by defining a query, pulling headings selecting one or more results identifying data to replicate. Alternatively, the selection of one or more results is performed using a likeness system (known to those of skill in the art) where all data similar to the selected data is replicated.

Execute a sub-set replication query based on previous queries. In this example, the sub-set replication can be scheduled.

Identify sub-set replication queries used most frequently and running automatically on behalf of the user.

Automatically defining or identifying previous queries based on device profile on behalf of the user, by the system.

Sub-set queries defined and stored in a portable structured markup supporting the publishing and sharing of queries.

In the later example, the following is provided as a pseudocode for implementing the invention.

```
<sub-set-replication-query type="mail" owner="bgoodman"
signature="$#%@$%REWRGFRGSDF">
<restrictions field="name" type="contains" value="Rachel Thomas"/>
<restrictions field="profile" type="equalto" value="GSM Modem"/>
</sub-set-replication-query>
```

As discussed, the system and method of the invention has the ability to replicate documents based on the user's calendar events. By way of illustrative example, the replication system may determine the current time, query (or look at) the user's calendar entries for the near term and automatically replicate emails (or other database documents) based on the content of the user's upcoming or current calendar entries, e.g., events, persons, times, etc. So, for example, if user "A" has a customer meeting at 11:00 AM with four customers, "B", "C", "D" and "E", and the current time is 10:30 AM, the replication will automatically prioritize replication so that any emails or documents from "B", "C", "D" and "E" and subject related to the customer meeting are prioritized and sent to the user prior to any other emails or documents.

In another application using the calendar events, the system is capable of identifying "down" periods of replication time on the calendar. For example if "A" has a flight scheduled on the calendar, the system could realize that "A's" replication priorities for the customer meeting should become active earlier in the day since "A" will not be able to replicate very much, if at all, prior to the meeting. Calendar entries would have a field that describes these down periods or off network periods as such or an intelligent agent could scan entries and make that determination.

Additionally, in the example of using the user's history, a log would maintain a history to determine all emails that were read/opened/viewed within a certain, predetermined time period. The time threshold would be a profile based and definable by the user. With this implementation, all email recipients on the carbon copy or send to list in recently viewed emails would automatically be prioritized for the next replication of incoming email.

FIGS. 2-5 are flow diagrams of an embodiment of the invention. FIGS. 2-5 may also be representative of a high-level block diagram, implementing the steps of the invention. The steps of FIGS. 2-5 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Figure 2:
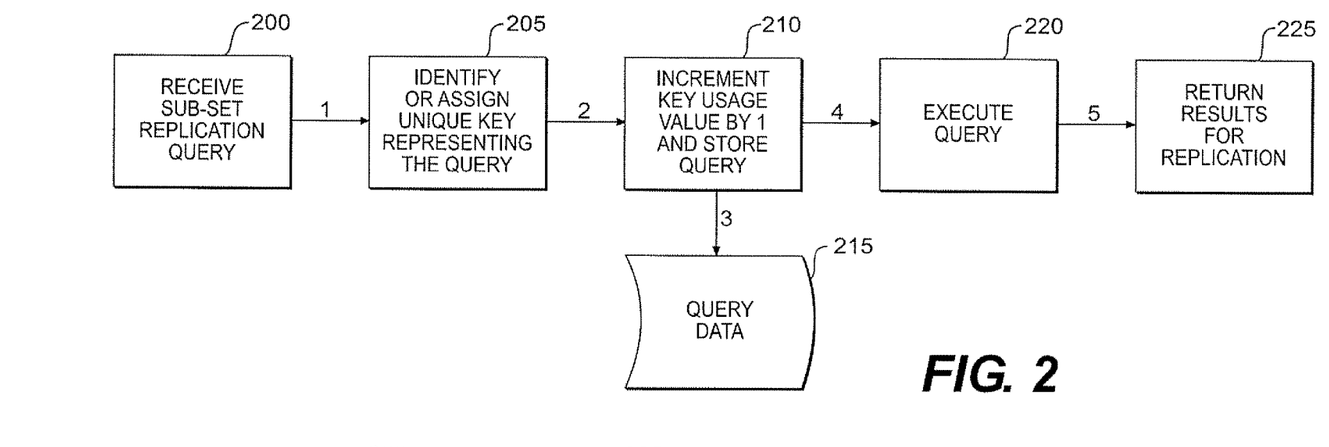
FIG. 2 shows a flow-chart identifying sub-set replication using a "learning" system in accordance with the invention.

Referring now to FIG. 2, a flow diagram identifying sub-set replication using a "learning" system to permit automatic querying of a server is shown. In this example, the system determines queries most frequently used and runs the system automatically on behalf of the user; that is, this example shows a simple query using basic terms, which may be defined as urgent tag, profile or size.

At step 200, the system of the invention receives a subset replication query. This query may be, for example, to correlate recently viewed email to new incoming email (recipient to recipient type matches). At step 205, the system of the invention identifies and assigns unique keys representing the query. As an example, the system performs an actual text search for a specific keyword, name, etc. At step 210, the system increments a key value for the query in order to learn the usage frequency of this query, and stores the query in a database, for example. At step 215, the query data is previewed before execution. The query can be built into a "most frequent" list, which may, in embodiments, be shared amongst users. At step 220, the query is automatically run without being prompted, in embodiments, using a keyword search to execute query. At step 225, the results of the query are returned to the user.

Figure 3:
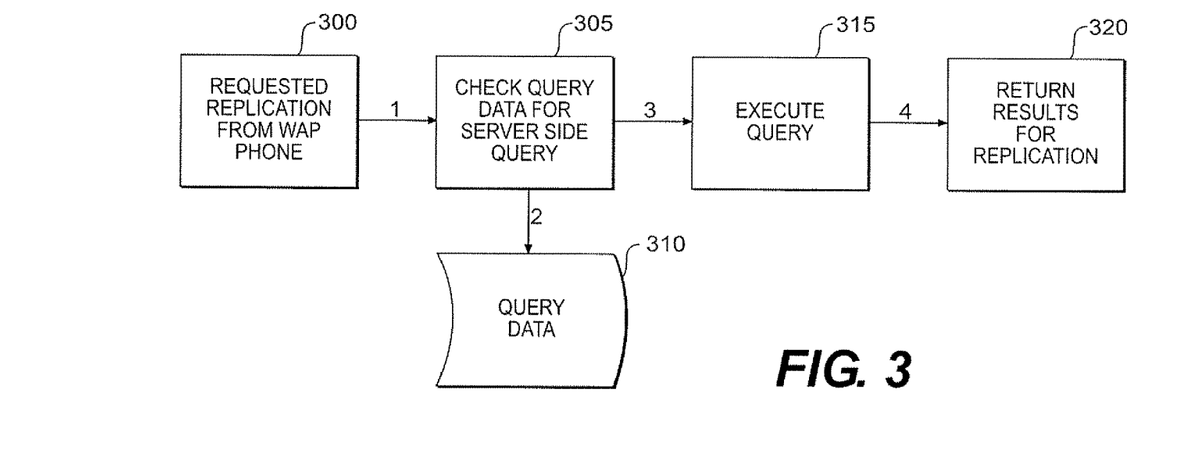
FIG. 3 shows a flow chart identifying a server side storage and execution example in accordance with the invention.

FIG. 3 shows a flow chart identifying a server side storage and execution example in accordance with the invention. In this example, the sub-set query execution is stored and executed on the server side in a pre-emptive or request driven manner. As should be understood, this is an example of a different end-user application to perform the requests in FIG. 2.

At step 300, a request for a replication from a wireless application protocol (WAP) is made. By way of another example, a server or wireless service (or both) is used as an interface between the email server and a device. At step 305, the system of the invention identifies and assigns unique keys representing the query. In an example, the system performs an actual text search for a specific keyword, name, etc. At step 310, the system checks the query data for a service side query. At step 315, the query is run. At step 320, the results of the query are returned to the user.

Figure 4:
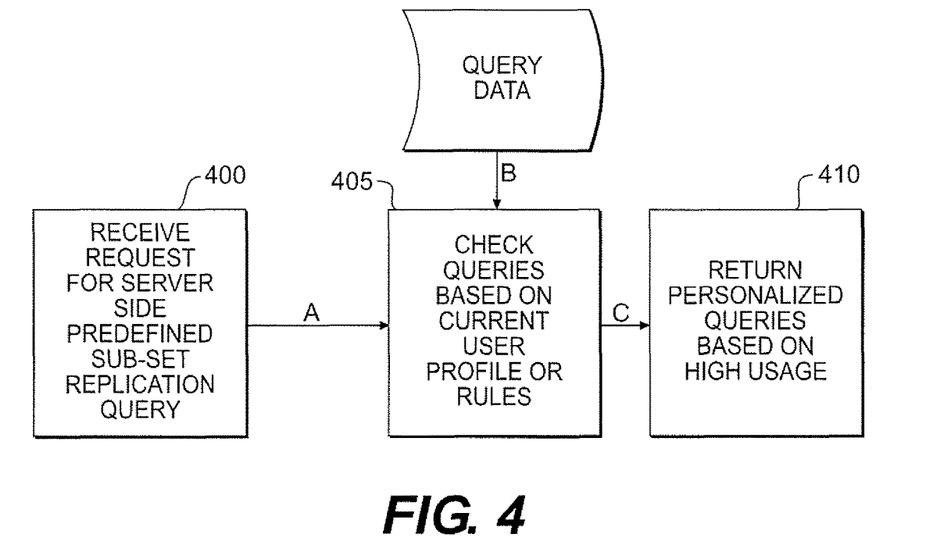
FIG. 4 shows a flow chart identifying a sub-set replication query retrieval example in accordance with the invention.

FIG. 4 shows a flow chart identifying a sub-set replication query retrieval example in accordance with the invention. In this example, the server learns from high usage of repetitive queries by the user and then defines rules automatically. At step 400, the system receives a request for a service side predefined set replication query. At step 405, the system checks queries base on current user, profile or rules. At step 410, the personalized results are returned based on high usage.

Figure 5:
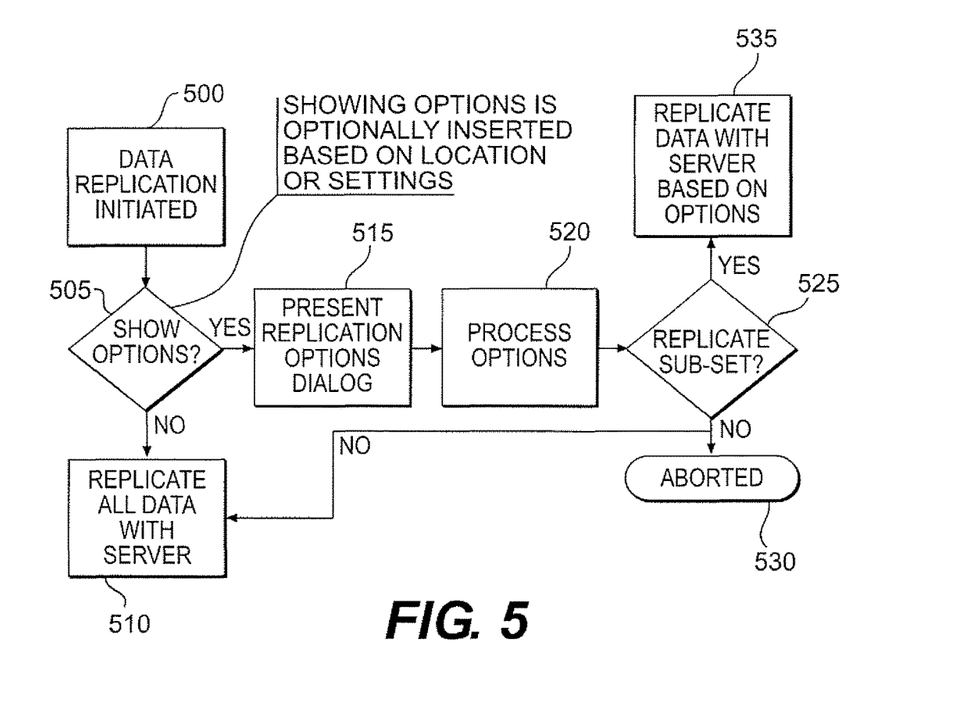
FIG. 5 illustrates logic flow in accordance with the invention.

FIG. 5 illustrates a logic flow in accordance with the invention. In this flow, data replication can be initiated by either a user or the system of the invention. In FIG. 5, as with other embodiments, the flow of the method, depending on the source device/location requesting a query, may be implemented on a wireless device, and the options may be displayed differently (text versus GUI) or may not be displayed as defined by the program. In this embodiment, the invention utilizes the metadata of email headers At step 500, data replication is initiated. At step 505, options are shown to the user. This step may be optional depending on the location or settings. The options may be a drop down menu requesting the user to select whether rules are to be used to obtain an electronic document (email). If the user does not select any rules, for example, the flow will continue to step 510, at which stage all of the emails will be retrieved from the server. If the user selects a rule(s), the system will proceed to step 515.

Figure 6:
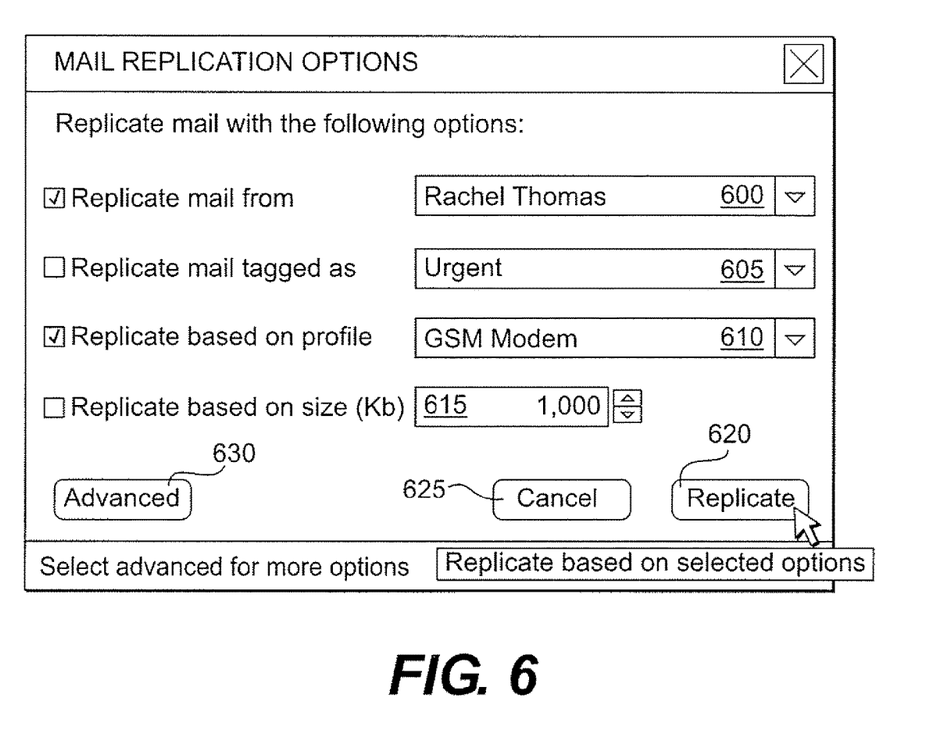
FIG. 6 shows a graphical user interface (GUI) representing the sub-set replication query for a current transaction.

At step 515, a dialog box, such as that shown in FIG. 6, may be provided. This provides the user with the option of selecting a certain rule. At step 520, the rule(s) are processed (such as described with reference to FIG. 2). At step 525, a decision will be made to replicate the subset of documents, in accordance with the defined rules. If not, the system will be aborted at step 530. If the documents are to be replicated, then replication will begin at step 535.

FIG. 6 shows a graphical user interface (GUI) representing a sub-set replication query for a current transaction. The GUI includes several processing rules used to build a query. These rules permit filtering based on any part (field) of the document. Some examples of specifying a sub-set replication includes any query defined by data format fields (e.g., size, urgency) or environment variables (e.g., requesting device, location—longitude & latitude, time, schedules).

The GUI may include, for example, the following dialog boxes:
  replicate email from, 600;
  replicate email tagged as, 605;
  replicate based on profile 610; and
  replicate based on size, 615.

The email replication may be initiated by selecting the "replicate" option 620 or canceled by selecting the "cancel" option 625, as discussed fully with reference to FIG. 5, for example. In addition, the GUI may include an advanced option feature 630.

In the example of FIG. 6, the options may provide the user with many different variations. For example, the "replicate email tagged as" option 605 may include different priority options ranging from low to high, as well as using specific content queues, etc. The "replicate base on size" 615 option might indicate to compress the content, transfer a limited number of data elements at a time or restrict the transfer to a predefined byte count (some plans charge per MB). The predefined replication rule sets can also be shared amongst users.

Figure 7:
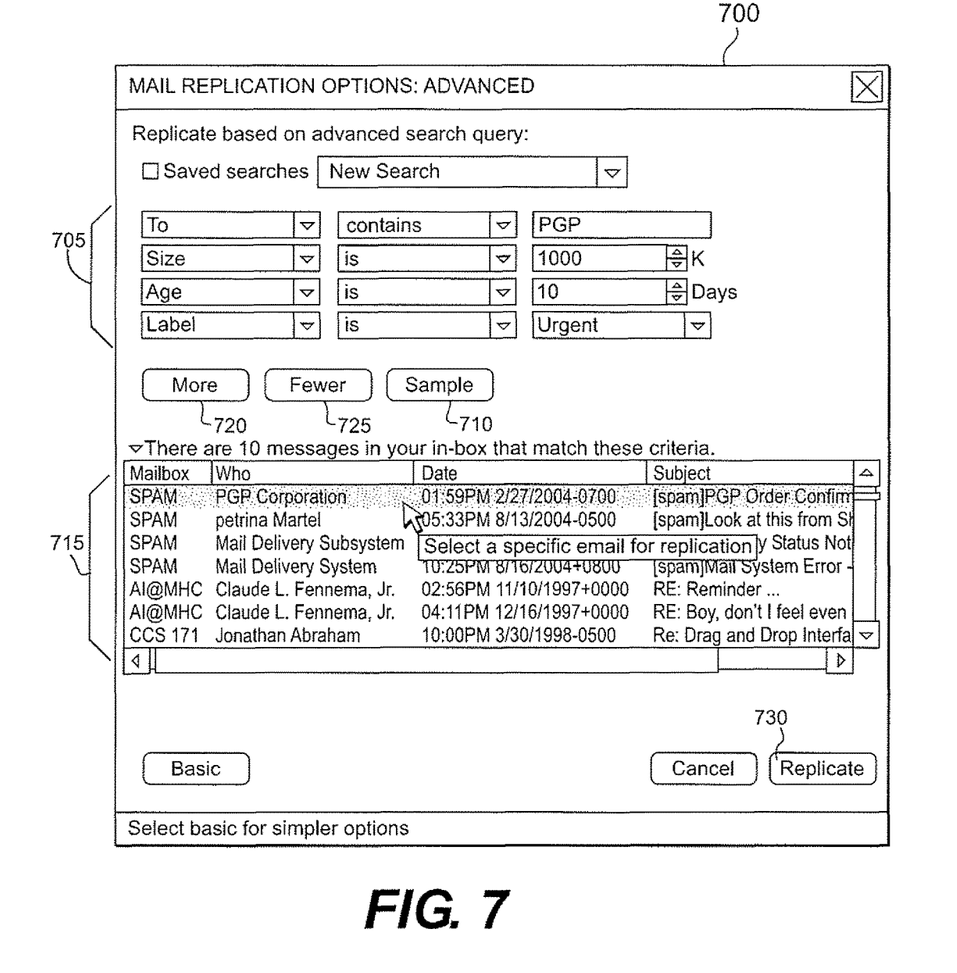
FIG. 7 shows an advanced dialog box in accordance with the invention.

FIG. 7 shows an advanced dialog box in accordance with the invention. In this dialog box, generally referred to as reference numeral 700, the user is provided with advanced options for querying of a server based on, for example, the initial request of FIG. 6. In this example, query terms can be added or removed to arrive at a complex data filter. In this example, the queries are based on the available fields as defined by the data format.

In the embodiment of FIG. 7, the user is provided with a drop down menu of Boolean and other variable terms, generally shown at reference numeral 705. These terms may include: "is", "greater than", "less than", as well as further definitions which may be based on the initial search term of FIG. 6. The sample selection 710 provides the user with the ability to execute the query against the email server to "sample" the results. The query can then be run to select the documents for replication, selected individually or "clicked" for other selection options shown generally at reference numeral 715. Also, using the selections in box 715, the user has the ability to preview the result set before replication and then graphically picks and choose which replication the user desires.

The GUI of FIG. 7 also offers the ability to select more 720 or fewer 725 selections. The user also has the ability to replicate some or all of the results by selecting the replicate option, after highlighting the samples and selecting the "Replicate" option 730. By using the system and method, the user also has the ability to replicate documents "like" the documents found in the advanced search query, using well-known likeness applications. In this manner, more detailed filtering and preview options are available.

The end user could also view the current replication priority and manually change it based on the GUI rather than a set of replication formulae. For example, the end user might want to simply look at the replication queue without any search queries defined and locate a document lower in the list, decide they need that document, and then click and drag that document to the top of the list or right click and identify it as a high priority, etc. This method would not require the user to enter any search queries. By way of illustration, person "A" is traveling and only has access to the network with a wide area wireless cell phone (slow speed). The person "A", can review the list of pending replication and click or select a specific email (header info, reference 715) and identify it as the first email to replicate.

The advanced feature, as well as the options of FIG. 6 may also be used to learn information from the user for future queries. Finally, selecting the "Replicate" selection 715 can be selected to initiate replication procedures based on the sub-set replication query. All other actions might result in full-replication or process termination.

In embodiments, the systems and/or methods described in FIGS. 2-9 may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to provide replication of data based on AI or rule based filtering, for example. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Example

As an illustrative example, consider a scenario where an executive is to deliver a strategically important presentation, focused on future company direction. In this meeting, everything must go flawlessly in order to sell this new groundbreaking concept. An urgent phone message from the financial planner is received that there was a severe mistake in the cost analysis section. The financial planner has now updated and retransmitted the presentation as "Urgent". The presenter must get the updated presentation. The challenge is that the meeting starts in five minutes. With the implementation of the system and method of the invention, the executive can replicate the urgent message by using a rule, which filters to the sender, time and content of the document, for example.

While the invention has been described in terms of embodiments, those skilled in the art will recognize that the invention can be practiced with modifications and in the spirit and scope of the appended claims.

What is claimed is:
1. A method comprising:
storing electronic data in a server;
receiving a request to obtain a subset of the electronic data;
filtering the electronic data on a transaction per transaction basis based on characteristics of the electronic data;
automatically determining a replication priority based on a user's calendar events by determining a current time and looking up the user's calendar events within a predetermined upcoming period of time and further based on a usage frequency corresponding to each of a plurality of queries used by the user;

in response to the request to obtain electronic data, automatically replicating the filtered electronic data on the transaction per transaction basis using the automatically determined replication priority based upon the user's calendar events within the predetermined upcoming period of time and the usage frequency corresponding to each of the plurality of queries used by the user; and providing the filtered replicated electronic data over a network for viewing of the filtered replicated electronic data.

2. The method of claim 1, wherein the providing step comprises displaying a number of results associated with the replicated electronic data for sampling and further refinement.

3. The method of claim 1, wherein the filtered replicated electronic data has matching criteria to at least learned information and one or more defined rules, the learned information is learned from types of queries a user performs, and the one or more rules includes replicating based on at least one of files with attachments, search criteria, usage patterns, device defined rules, and shared rules.

4. The method of claim 3, further comprising providing a graphical user interface (GUI) to input the one or more defined rules for filtering the electronic data.

5. The method of claim 4, wherein the GUI restricts replication based on at least one of data properties, advanced search criteria and data sampling.

6. The method of claim 4, wherein the GUI includes processing rules used to build a query and provides options including at least one of replicate email from, replicate email tagged as, replicate based on profile, and replicate based on size.

7. The method of claim 1, further comprising replicating the electronic data based on at least one of calendar events, sender or receiving profiles and usage patterns.

8. The method of claim 1, further comprising:
modifying a given replication transaction, wherein the modifying comprises at least one of:
identifying a sub-set replication query through at least one of basic terms defined by a data format, an advanced query based on free text matching against known fields in the data format, and a likeness system;
previewing results by identifying a sub-set replication query;
executing a sub-set replication query based on previous queries;
automatically defining or identifying previous queries based on device profile; and
defining and storing in a portable structured markup supporting sharing queries.

9. The method of claim 1, wherein the steps of claim 1 are provided on a subscription, advertising, and/or fee basis.

10. The method of claim 1, wherein the steps of claim 1 are provided by a service provider that creates, maintains, and supports a computer infrastructure that performs the steps of claim 1.

11. The method of claim 1, further comprising receiving payment from customer(s) under a subscription and/or fee agreement.

12. A computer program product comprising a computer readable hardware storage device having readable program code embodied in the storage device, the computer program product including instructions which, when executed by a computing device, causes the computer to perform the steps of:
storing electronic data in a server;
receiving a request to obtain a subset of the electronic data;
filtering the electronic data on a transaction per transaction basis based on characteristics of the electronic data;
automatically determining a replication priority performing pattern analysis based on a user's calendar events by determining a current time and looking up the user's calendar events within a predetermined upcoming period of time and further based on a usage frequency corresponding to each of a plurality of queries used by the user;
in response to the request to obtain electronic data, automatically replicating the filtered electronic data on the transaction per transaction basis using the automatically determined replication priority based upon the user's calendar events within the predetermined upcoming period of time and the usage frequency corresponding to each of a plurality of queries used by the user; and
providing the filtered replicated electronic data over a network for viewing of the filtered replicated electronic data.

13. The computer program product of claim 12, wherein the filtered replicated electronic data has matching criteria to at least learned information and one or more defined rules, the learned information is learned from types of queries a user performs, and the one or more rules includes replicating based on at least one of files with attachments, search criteria, usage patterns, device defined rules, and shared rules.

14. The computer program product of claim 13, wherein the at least one component is further operable to provide a graphical user interface (GUI) to input the one or more defined rules for filtering the electronic data.

15. The computer program product of claim 14, wherein the GUI restricts replication based on at least one of data properties, advanced search criteria and data sampling.

16. The computer program product of claim 14, wherein the GUI includes processing rules used to build a query and provides options including at least one of replicate email from, replicate email tagged as, replicate based on profile, and replicate based on size.

17. A method implemented in a computer infrastructure having computer executable code tangibly embodied on a computer readable storage medium having programming instructions operable for:
storing electronic data in a server;
receiving a request to obtain a subset of the electronic data;
filtering the electronic data on a transaction per transaction basis based on characteristics of the electronic data;
automatically determining a replication priority based on a user's calendar events by determining a current time and looking up the user's calendar events within a predetermined upcoming period of time and further based on a usage frequency corresponding to each of a plurality of queries used by the user;
in response to the request to obtain electronic data, automatically replicating the filtered electronic data on the transaction per transaction basis using the automatically determined replication priority based upon the user's calendar events within the predetermined upcoming period of time and the usage frequency corresponding to each of a plurality of queries used by the user; and providing the filtered replicated electronic data over a network for viewing of the filtered replicated electronic data, wherein the filtered replicated electronic data has matching criteria to at least one or more defined rules, and the one or more rules includes replicating based on at least one of files with attachments, search criteria, the usage frequency corresponding to each of the plurality of queries used by the user, device defined rules, and shared rules, wherein the programming instructions are further operable to provide a graphical user interface (GUI) to input the one or more defined rules for filtering the electronic data, wherein the GUI restricts replication based on at least one of data properties, advanced search criteria and data sampling, and wherein the GUI includes processing rules used to build a query and provides options including at least one of replicate email from, replicate email tagged as, replicate based on profile, and replicate based on size, and further comprising:

modifying a given replication transaction, wherein the modifying comprises at least one of:

identifying a sub-set replication query through at least one of basic terms defined by a data format, an advanced query based on free text matching against known fields in the data format, and a likeness system;

previewing results by identifying a sub-set replication query;

executing a sub-set replication query based on previous queries;

automatically defining or identifying previous queries based on device profile; and defining and storing in a portable structured markup supporting sharing queries.

18. The method of claim 17, wherein the pattern analysis is performed by an artificial intelligence agent provided in the server, and wherein at least one of the one or more rules are defined by a rule based filtering mechanism provided in the server.

* * * * *